United States Patent [19]

Huber

[11] Patent Number: 4,781,280

[45] Date of Patent: Nov. 1, 1988

[54] FRICTION CLUTCH

[75] Inventor: Lothar Huber, Bühl, Fed. Rep. of Germany

[73] Assignee: Luk Lamellen und Kupplungsbau, Bühl, Fed. Rep. of Germany

[21] Appl. No.: 77,076

[22] Filed: Jul. 24, 1987

Related U.S. Application Data

[63] Continuation of Ser. No. 672,598, Nov. 16, 1984, abandoned.

[30] Foreign Application Priority Data

Dec. 1, 1983 [DE] Fed. Rep. of Germany ....... 3343527
Jan. 13, 1984 [DE] Fed. Rep. of Germany ....... 3420108

[51] Int. Cl.⁴ ............................................. F16D 13/50
[52] U.S. Cl. ................................ 192/70.27; 192/89 B
[58] Field of Search ........................... 192/70.27, 89 B

[56] References Cited

U.S. PATENT DOCUMENTS

| 3,499,512 | 3/1970 | Maurice | 192/89 B X |
|---|---|---|---|
| 3,712,436 | 1/1973 | Rist | 192/89 B |
| 3,811,544 | 5/1974 | Maucher | 192/89 B |
| 3,939,951 | 2/1976 | Sink et al. | 192/89 B |
| 4,195,719 | 4/1980 | Martinez | 192/89 B |
| 4,254,853 | 3/1981 | Huber | 192/70.27 |
| 4,273,228 | 6/1981 | Huber | 192/89 B |
| 4,353,451 | 10/1982 | Bacher | 192/89 B |
| 4,491,211 | 1/1985 | Steeg | 192/89 B |

FOREIGN PATENT DOCUMENTS

| 2529988 | 1/1976 | Fed. Rep. of Germany .... | 192/89 B |
|---|---|---|---|
| 1524350 | 5/1968 | France . | |
| 2242892 | 3/1975 | France | 192/89 B |
| 2305638 | 10/1976 | France | 192/89 B |
| 2334009 | 7/1977 | France | 192/89 B |
| 2489453 | 3/1982 | France | 192/89 B |
| 2492485 | 4/1982 | France | 192/89 B |
| 1347485 | 2/1974 | United Kingdom . | |
| 2096248 | 10/1982 | United Kingdom | 192/89 B |

Primary Examiner—Leslie A. Braun
Assistant Examiner—David A. Testard
Attorney, Agent, or Firm—Peter K. Kontler

[57] ABSTRACT

A friction clutch wherein the diaphragm spring is tiltably installed between two seats one of which abuts against or is integral with the cover. The other seat is permanently urged against the diaphragm spring, so that the latter is permanently urged against the one seat, by axially stressed lugs which form integral parts of the cover and extend axially through apertures in the diaphragm spring to bear against the other seat or carry rivets with heads bearing against the other seat.

41 Claims, 6 Drawing Sheets

FRICTION CLUTCH

This application is a continuation of application Ser. No. 672,598, filed Nov. 16, 1984, now abandoned.

CROSS-REFERENCE TO RELATED CASE

The matter which is illustrated in FIGS. 11 to 14 of the present application is similar to that which is described and shown in the commonly owned copending patent application Ser. No. 343,209 now U.S. Pat. No. 4,660,700 filed Jan. 27, 1982 by Paul Maucher for "Friction clutch". Somewhat similar friction clutches are further disclosed in commonly owned U.S. Pat. No. 3,811,544 granted to Paul Maucher and in commonly owned U.S. Pat. No. 4,273,228 granted to Lothar Huber.

BACKGROUND OF THE INVENTION

The present invention relates to friction clutches in general, especially to improvements in friction clutches which can be used with advantage in motor vehicles. More particularly, the invention relates to improvements in friction clutches of the type wherein a pressure plate is biased against a clutch disc by a diaphragm spring which is installed between two seats and wherein the diaphragm spring is secured to the cover in such a way that it can be tilted between the two seats while the clutch changes its state from engaged to disengaged condition or vice versa. Still more particularly, the invention relates to improvements in friction clutches of the type wherein the means for coupling the diaphragm spring to the cover of the friction clutch extend axially through and inwardly beyond the diaphragm spring.

It is well known to mount the diaphragm spring on the cover of a friction clutch in such a way that the diaphragm spring is tiltable between two seats. For example, it was already proposed to secure the diaphragm spring to the cover by rigid fasteners in the form of rivets or in the form of integral portions of the cover. A drawback of such proposal is that the diaphragm spring is invariably installed with some play if the cover, the diaphragm spring, the seats and/or the fasteners are machined with a certain amount of tolerance, i.e., if the dimensions of such parts deviate from optimum dimensions. Alternatively, the diaphragm spring is held between the two seats with an excessive force so that it cannot be readily tilted for the purpose of engaging or disengaging the friction clutch. The just outlined situation can arise if the rivets which secure the diaphragm spring and the seats to the cover are too short. In either event (i.e., if the diaphragm spring is held between the seats with a certain amount of play or if the amount of play is zero and the diaphragm spring is clamped between the seats with an excessive force), the efficiency of the friction clutch is less than satisfactory especially if the diaphragm spring is installed between the two seats with a certain amount of play so that the clutch release means must cover a greater distance than necessary in order to change the state of the clutch from engaged condition to disengaged condition or vice versa. If the diaphragm spring is clamped between the seats with an excessive force, the wear upon the spring and upon the seats rapidly reaches a value at which the friction clutch must be repaired or discarded. Excessive clamping of the diaphragm spring between the seats also leads to excessive frictional hysteresis which, in turn, entails excessive flexing of the prongs which form part of the diaphragm spring and must be displaced by a bearing or the like in order to engage or disengage the clutch.

Another drawback of presently known systems for securing the diaphragm spring between two seats at the inner side of the cover in a friction clutch is that the play between the diaphragm spring and the seats invariably increases as a result of wear upon such parts so that the distance through which the prongs of the diaphragm spring must be flexed or shifted in order to engage or disengage the clutch must be increased gradually which is undesirable for obvious reasons, especially when the friction clutch is installed in a motor vehicle to transmit torque between the crankshaft of the internal combustion engine and the wheels. The wear entails a rapid increase of play between the diaphragm spring and its seats, even if the play is zero when the friction clutch is new.

Heretofore known friction clutches wherein the means for holding the diaphragm spring at the inner side of the cover constitute integral parts of the cover also exhibit a number of serious drawbacks. This applies irrespective of whether or not the integral portions of the cover bear directly against the inner side of the diaphragm spring. For example, it was already proposed to construct rivets which connect the diaphragm spring with the cover in such a way that the rivets exhibit shoulders for the diaphragm spring. The main drawback of such types of coupling means for the diaphragm spring is that they, too, enable the diaphragm spring to move between its seats with a progressively increasing play as the wear upon the diaphragm spring, its seats, the cover and the coupling means progresses so that the distance through which the clutch engaging or disengaging means must be moved in order to change the condition of the clutch must be increased from time to time during the useful life of the friction clutch.

Attempts to overcome the just discussed drawbacks of conventional friction clutches include the provision of one or two resilient seats which are intended to compensate for wear upon the diaphragm spring, the seats and/or the coupling means and to thus ensure that the distance which the clutch actuating device must cover will remain the same irrespective of the age and extent of wear upon the clutch. The bias of the resilient seat or seats must exceed the force which is applied in order to change the condition of the friction clutch, i.e., such bias must exceed the force which the diaphragm spring exerts upon the resilient seat or seats during a change in the condition of the friction clutch. This contributes significantly to the useful life of the clutch and to more predictable operation during engagement or disengagement because the wear upon the seats, upon the diaphragm spring and upon the means for coupling the diaphragm spring to the cover is compensated for by the resiliency of the seat or seats. The just outlined advantages can be achieved by employing at least one resilient seat or by employing an additional spring which is installed between the coupling means and one of the seats, between one of the seats and the diaphragm spring or between one of the seats and the cover. Such additional spring must be adequately stressed during assembly of the diaphragm spring with the seats and the cover of the friction clutch. The additional spring or each of the resilient seats can resemble or constitute a second diaphragm spring which preferably constitutes that seat that faces the inner side of the main diaphragm spring, i.e., that side which faces away from the inner side of the cover. Such seat in the form of a second diaphragm spring can be secured to the cover by rivets, by other types of fasteners or by integral portions of the cover. A drawback of this proposal is that the second diaphragm spring contributes significantly to the overall cost of the friction clutch, not only because it must be constructed, configured and dimensioned with a high degree of precision but also because it must be mounted in the friction clutch with a view to ensure that it undergoes the right amount of initial stressing.

OBJECTS AND SUMMARY OF THE INVENTION

An object of the invention is to provide a novel and improved friction clutch which exhibits all advantages of heretofore known friction clutches with diaphragm springs that are clamped between their seats but is simpler, more rugged and less expensive.

Another object of the invention is to provide a friction clutch wherein the seat or seats need not be designed with a view to bias the diaphragm spring and wherein the bias upon the diaphragm spring to eliminate play between the seats need not be exerted with resort to an additional part.

A further object of the invention is to provide a novel and improved cover or housing for use in a friction clutch of the type wherein the diaphragm spring is clamped between its seats and is installed at the inner side of the clutch cover.

An additional object of the invention is to provide a novel and improved method of clamping the diaphragm spring of a friction clutch between its seats and of securing the seat or seats and the diaphragm spring to the cover.

Still another object of the invention is to provide a novel and improved system for coupling one or more seats and the diaphragm spring to the cover of a friction clutch for use in motor vehicles.

Another object of the invention is to provide a friction clutch which need not employ any discrete seats for the diaphragm spring.

A further object of the invention is to provide a friction clutch wherein the diaphragm spring is adequately held between its seats during the entire useful life of the clutch.

Another object of the invention is to provide a novel and improved method of assembling a friction clutch of the above outlined character.

An additional object of the invention is to provide a novel and improved method of applying to the diaphragm spring a required stress which suffices to ensure that the diaphragm spring is held between its seats without any play during the full useful life of the clutch.

One feature of the invention resides in the provision of a friction clutch which is particularly suited for use in motor vehicles, e.g., in the power train between the crankshaft of the internal combustion engine and the input element of the change-speed transmission. The improved friction clutch comprises an annular housing or cover including a main portion (such main portion can be affixed to the flywheel which is rotated by the crankshaft of the engine) and flexible elastic lugs which are integral with the main portion of the housing, an annular seat at one side of the housing, an apertured diaphragm spring including an annular section having a first side facing the seat and a second side facing away from the housing, and means for coupling the spring to the housing including fasteners which are rigid with the lugs, which extend through the spring, and which have portions disposed at the second side of the annular section of the diaphragm spring. The just mentioned portions of the fasteners cooperate with the diaphragm spring and with the seat to maintain the respective lugs in axially stressed condition so that the lugs cause the portions of the fasteners to bias the annular section of the diaphragm spring against the seat.

The fasteners can constitute prefabricated rivets and the aforementioned portions of the fasteners then preferably constitute heads which are provided on the respective rivets and cause the diaphragm spring to bear against the seat.

Each lug preferably comprises or constitutes a substantially cantilever-like beam which stores energy to urge the aforementioned portion of the respective fastener toward the second side of the annular section of the diaphragm spring in the axial direction of the spring. Each lug has an end portion which merges into the main portion of the housing (i.e., which continues to form an integral part of the housing), and the fasteners are preferably remote from the end portions of the respective lugs. If the fasteners are prefabricated rivets or analogous securing elements, they are preferably riveted to the respective lugs, i.e., each lug can have an opening through which a portion of the shank of the respective rivet extends and such shank is then formed with a head adjacent to that side of the respective lug which faces away from the annular section of the diaphragm spring.

The fasteners can be configured in such a way that their aforementioned portions together constitute a second seat for the annular section of the diaphragm spring. For example, if the fasteners constitute rivets, the rivets can be formed with shoulders constituting the aforementioned portions of the fasteners and bearing directly against the second side of the annular section of the diaphragm spring. The same result can be achieved if the fasteners are integral parts of the respective lugs.

An annular seat can be installed adjacent the second side of the annular section of the diaphragm spring and, if the fasteners include or are rivets, the rivets are provided with prefabricated heads which constitute the aforementioned portions of the respective fasteners and bear against the second seat so as to urge the latter against the diaphragm spring under the bias of the lugs whereby the diaphragm spring bears against the seat which is disposed between its annular section and the housing. The second seat can constitute a wire ring.

If the fasteners are integral with the respective lugs, each lug preferably comprises a first portion which is integral with the major portion of the housing and a second portion which is bent over with reference to the first portion (e.g., through an angle of approximately 90 degrees) and constitutes the respective fastener. The second portion of each lug can include an end portion or tip which constitutes the aforementioned portion of the respective fastener and bears against the second seat or directly against the second side of the annular section of the diaphragm spring.

The annular section of the diaphragm spring and the seat between the housing and the diaphragm spring overlie each other adjacent to a ring-shaped zone of the housing, and the lugs can extend at least substantially radially of and across such zone. In other words, the lugs can extend substantially radially of the diaphragm spring. The arrangement may be such that the outermost or the innermost end portion of each substantially radially extending lug is integral with the major portion of the housing, i.e., that the innermost or the outermost part of each lug (as considered radially of the diaphragm spring) merges into the major portion of the housing.

Alternatively, the lugs can extend at least substantially in the circumferential direction of the diaphragm spring. Also, at least a part of each lug can have a substantially circular shape and/or at least a part of each lug can resemble a wedge. If the lugs include wedge-shaped parts, the wider portions of such parts preferably merge into the major portion of the housing. The lugs can be provided in the substantially ring-shaped inner marginal portion of the housing or they may be spaced apart from such marginal portion, as considered in the radial direction of the diaphragm spring.

The housing can be provided with cuts which at least partially surround the lugs, depending upon whether or not the lugs are provided in the inner marginal portion of the housing. The cuts can constitute narrow slits or passages which are obtained by actually removing some material from the housing. The slits can be at least substantially U-shaped, V-shaped, horseshoe-shaped, keyhole-shaped or otherwise configurated in order to ensure that the lugs can be adequately stressed to store energy which is needed to permanently urge the second seat against the annular section of the diaphragm spring or to cause the fasteners (rivets or integral portions of the lugs) to bear directly against the annular section of the diaphragm spring.

The seat between the diaphragm spring and the housing can constitute an integral part (e.g., a corrugation) of the housing. Such seat can include a plurality of arcuate sections which extend toward the annular section of the diaphragm spring and alternate with the lugs, i.e., the seat between the housing and the diaphragm spring can be interrupted in the region of each lug. Alternatively, sections of the seat between the housing and the diaphragm spring can be less pronounced than those which alternate with the lugs. If the lugs are provided with arcuate sections of a corrugation on the housing, the thickness of the section on each of the lugs (as considered in the axial direction of the friction clutch) can be a fraction (e.g., a minute fraction) of the thickness of an arcuate section between two neighboring lugs. In fact, the lugs can be provided with grooves or flutes which extend between the neighboring arcuate sections of the corrugation so as to ensure that the lugs do not come in contact with the annular section of the diaphragm spring even when they are stressed axially to urge the diaphragm spring toward the housing.

The distance between that end portion of each lug which is integral with the major portion of the housing and the axis of the respective fastener can be between 3.5 and 10 times (most preferably between 4 and 6 times) the thickness of the housing. However, in certain types of clutches the just mentioned distance can be more than 10 times the thickness of the housing. The distance between that end portion of each lug which is integral with the major portion of the housing and the aforementioned ring-shaped zone where the annular section of the diaphragm spring overlies the seat at the inner side of the housing can be between 2 and 6 times (preferably between 2.5 and 4 times) the thickness of the housing.

The thickness of that end portion of each lug which merges into the major portion of the housing can be less than the average thickness of the housing, e.g., due to the provision of the aforementioned grooves or flutes between the neighboring arcuate sections of a corrugation which forms an integral part of the housing and constitutes the seat between the housing and the annular section of the diaphragm spring.

Another feature of the invention resides in the provision of several methods of assembling a friction clutch of the above outlined character. In accordance with one of the presently preferred embodiments, the method involves the use of prefabricated fasteners (e.g., in the form of rivets each of which has a first portion or head at one of its ends, a second portion (a portion of the shank) adjacent to the first portion, and a third portion which is remote from the first portion and can constitute a smaller-diameter portion of the shank) and is used for the assembly of a friction clutch wherein one side of a cover or housing is adjacent to an apertured diaphragm spring and a seat is disposed between the diaphragm spring and the housing. Such method comprises the steps of making in the housing a plurality of cuts to form lugs with end portions which continue to constitute integral parts of the housing, subjecting the lugs to an axial stress in a direction away from the diaphragm spring and beyond the elastic limit of the material of the housing and its lugs so that the lugs are axially offset with reference to the neighboring portions of the housing, placing the first portions of the fasteners adjacent to that side of the diaphragm spring which faces away from the housing, passing the second portions of the fasteners through the apertures of the diaphragm spring, and securing the third portions of the fasteners to discrete lugs in stressed condition of the lugs so that the lugs urge the first portions of the respective fasteners toward the diaphragm spring. The securing step can include riveting the third portions of the fasteners to the respective lugs. Pronounced tolerances can be compensated and the assembly of the clutch can be simplified if the lugs are bent beyond the elastic limit during riveting and if they remain stressed within the elastic limits upon completion of the riveting operation. Such method can further comprise the steps of placing an annular second seat (such as a wire ring) adjacent to that side of the diaphragm spring which faces away from the housing, and placing the first portions of the fasteners against the second seat so that the second seat is biased against the diaphragm spring upon completion of the securing step. This securing step can also include bending the lugs in a direction toward the diaphragm spring beyond the elastic limit of the material of the housing.

A somewhat modified method can be practiced by utilizing fasteners in the form of prefabricated rivets each of which has a head at one end and an elongated shank extending from the head. This method can be used to assemble a friction clutch wherein one side of the housing or cover is adjacent to the apertured diaphragm spring, wherein a first seat is disposed between the diaphragm spring and the housing and a second seat is disposed opposite the first seat and is adjacent to that side of the diaphragm spring which faces away from the housing. Such method comprises the steps of making in the housing a plurality of cuts (e.g., in the form of narrow slits) to form lugs with end portions which continue to form integral parts of the housing, placing the heads of the rivets against the second seat opposite the diaphragm spring, passing the shank of each rivet through the adjacent aperture of the diaphragm spring and through one of the lugs, and providing each shank with an enlarged portion (e.g., with a second head) at that side of the respective lug which faces away from the diaphragm spring and in such close proximity of the respective head that the length of the shanks between their heads and enlarged portions is less than the combined thickness of the diaphragm spring and the two seats so that each lug is subjected to an axial stress in a direction toward the diaphragm spring, i.e., each lug urges the head of the respective rivet toward and against the second seat whereby the second seat urges the diaphragm spring against the first seat which, in turn, is urged against the housing (except, of course, if the first seat is an integral part, e.g., a corrugation, of the housing). This method can also include bending of the lugs beyond the elastic limit of their material.

A third embodiment of the method is used for the assembly of a friction clutch wherein one side of the housing is adjacent to the apertured diaphragm spring and a seat (e.g., a wire ring) is disposed between the housing and the diaphragm spring. The method comprises the steps of making in the housing a plurality of cuts to form lugs with end portions which continue to form integral parts of the housing and preferably extend radially inwardly beyond the inner marginal portion of the housing, flexing those first portions of the lugs which are adjacent to the respective end portions in a direction away from the diaphragm spring and beyond the elastic limit of the material of the housing, bending those second portions of the lugs which are more distant from the respective end portions than the first portions through the apertures of and beyond that side of the diaphragm spring which faces away from the housing, and deforming the lugs so as to urge the diaphragm spring against the seat with attendant stressing of the first portion of each lug. This method can further comprise the step of placing a second seat (e.g., a second wire ring) against that side of the diaphragm spring which faces away from the housing, and the deforming step then preferably comprises deforming the lugs (e.g., the second portions of the lugs) into direct engagement with the second seat so that the stressed first portions of the lugs permanently urge the second seat against the diaphragm spring.

The seat between the housing and the diaphragm spring can be obtained by making in the housing an annular corrugation with arcuate sections disposed between neighboring lugs and located at that side of the housing which faces toward the diaphragm spring whereby the arcuate sections of the corrugation keep the lugs out of direct contact with the diaphragm spring. In all other respects, the method which includes the step of making in the housing a corrugation can be identical with one of the aforedescribed methods, i.e., the lugs can be deformed to constitute fasteners or the method can be practiced by utilizing prefabricated fasteners in the form of rivets or the like. The lugs can be provided with thinner corrugations or with no corrugations at all so as to ensure that they do not contact the diaphragm spring. In fact, those sides of the lugs which face the diaphragm spring can be provided with grooves or channels or with outwardly extending corrugations in order to reduce the likelihood of interference on the part of the diaphragm spring with the bending or flexing of the lugs for the purpose of ensuring that each lug stores sufficient energy to prevent any play between the diaphragm spring and the neighboring seat or seats.

The force with which the lugs urge the diaphragm spring against the seat which is adjacent to the housing, or with which the lugs urge the second seat against the diaphragm spring (so that the latter can bear against the seat which is adjacent to or forms part of the housing), exceeds the force which is necessary to tilt the spring relative to its seat or seats, i.e., to engage or disengage the clutch); this ensures that the diaphragm spring invariably remains in contact with the neighboring seat or seats, also during actual engagement or disengagement of the friction clutch.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
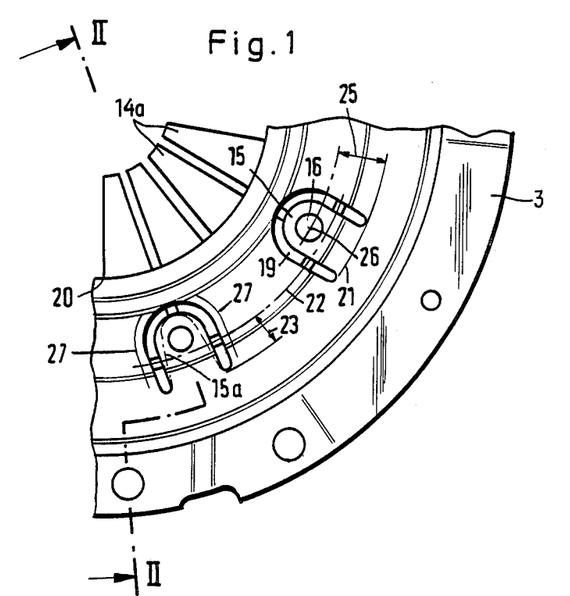
FIG. 1 is a fragmentary plan view of a friction clutch which embodies one form of the invention and wherein the means for coupling the diaphragm spring and two discrete seats to the cover comprises a set of rivets.
Figure 2:
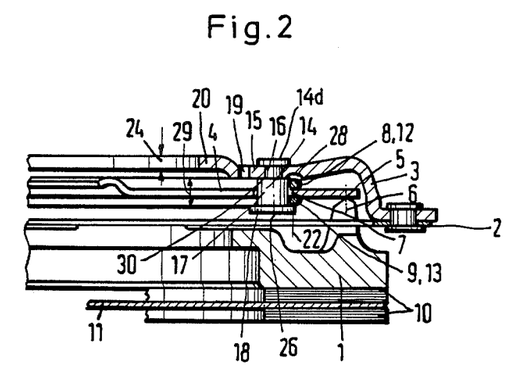
FIG. 2 is a fragmentary sectional view as seen in the direction of arrows from the line II—II of FIG. 1.

Referring first to FIGS. 1 and 2, there is shown a portion of a friction clutch which comprises a pressure plate 1, a cover or housing 3 and leaf springs 2 which connect the pressure plate 1 to the cover 3 in such a way that the pressure plate is movable axially toward and away from a clutch disc or clutch plate 11. The friction clutch further comprises a diaphragm spring 4 the radially outermost marginal portion 5 of which bears against projections 6 which are provided on the pressure plate 1 and thereby urges the latter against the adjacent friction lining 10 at the periphery of the clutch disc 11. This urges the other friction lining 10 against a flywheel (not shown) which is driven by the crankshaft of the engine, not shown. The flywheel rotates with the cover 3 and with the pressure plate 1 and, when the marginal portion 5 of the diaphragm spring 4 is free to bear against the projections 6 of the pressure plate 1, the clutch disc 11 is clamped between and rotates with the flywheel and the pressure plate 1. The hub of the clutch disc 11 can be connected to the input element of a change-speed transmission in the motor vehicle so that the friction clutch establishes a torque transmitting connection between the engine and the transmission whenever it is engaged, i.e., as long as the marginal portion 5 of the diaphragm spring 4 is free to urge the clutch plate 1 axially with a force which is required to ensure that the clutch disc 11 is compelled to rotate with the flywheel and with the parts 1, 3.

An intermediate annular portion or section 7 of the diaphragm spring 4 is installed between and is tiltable with reference to two concentric annular seats 8 and 9 which, in the embodiment of FIGS. 1 and 2, are constituted by wire rings 12 and 13, respectively. The seat 8 is immediately adjacent to the inner side of the cover 3, and the seat 9 is disposed at that side of the intermediate section 7 of the diaphragm spring 4 which faces away from the inner side of the cover 3. The diaphragm spring 4 is installed in prestressed condition so that, when the tips of its radially inwardly extending prongs 4a are not acted upon by a release bearing or another actuating device, the marginal portion 5 invariably exerts the force which is required to maintain the clutch in engaged condition, i.e., to transmit torque between the flywheel, clutch plate 1 and cover 3 on the one hand and the clutch disc 11 on the other hand.

The means for coupling the diaphragm spring 4 and the wire rings 12, 13 of the respective seats 8, 9 to the cover 3 comprises specially designed fasteners in the form of rivets 14. In accordance with a feature of the invention, the rivets 14 are secured to (rigid with) axially movable portions 15 of the cover 3. The movable portions 15 can be said to constitute lugs, flaps or leaves and are obtained by making in the cover 3 U-shaped slits or cuts 19. The making of such slits or cuts can involve actual removal of some material around each lug 15 or a mere severing of the material of the cover 3 around each lug. Each rivet 14 has an inner enlarged end portion or head 18 which overlies the adjacent portion of the wire ring 13 and an outer enlarged end portion or head 16 which overlies the outer side of the respective lug 15. Each lug 15 has a circular opening 15d (FIG. 9) for that (smaller-diameter) portion 14d of the shank of the respective rivet 14 which is immediately adjacent to the head 16 and is remote from the location where the radially outermost portion of the lug 15 merges into the main portion of the housing or cover 3. The larger-diameter portion 17 of the shank of each rivet 14 extends through the space within the wire ring 13, through one of an annulus of holes which are provided in the diaphragm spring 4 radially inwardly of the marginal portion 5, and through the space which is surrounded by the wire ring 12.

The slits 19 are located radially outwardly of the ring-shaped inner marginal portion 20 of the cover 3. This preserves the integrity of the marginal portion 20 and enhances the rigidity of the cover 3, as considered in the axial direction of the friction clutch. The two parallel legs of each U-shaped slit 19 extend substantially or exactly radially of the cover 3, i.e., each lug 15 also extends substantially radially of the cover 3 and merges (at a junction 21) into the material of the major part or portion of the cover 3 in the region at the radially outermost ends of the legs of the respective U-shaped slit 19. The locations of the legs of the U-shaped slits 19 (as considered in the radial direction of the cover 3) are selected in such a way that each lug 15 overlies the zone or region 22 where the section 7 of the diaphragm spring 4 is flanked by the wire rings 12, 13 of the respective seats 8, 9. The distance 23 between the junction 21 of a lug 15 with the major part or portion of the cover 3 and the region 22 of overlap between the diaphragm spring section 7 and the wire rings 12, 13 is approximately three times the thickness 24 of the material of the cover 3. The distance 25 between the axis 26 of a rivet 14 and the respective junction 21, the width of the junction 21 (as considered in the circumferential direction of the cover 3) and the thickness 24 of the cover 3 are selected in such a way that, when the rivet 14 is formed with the head 16 (i.e., when it is properly secured to the respective lug 15), the lug 15 is shifted axially with reference to the adjacent portions 27 of the cover 3 to such an extent that the shifting or deformation is within the elastic limits of the material of the cover 3. The lugs 15 tend to move axially in a direction away from the pressure plate 1 so that they cause the heads 18 of the respective rivets 14 to urge the wire ring 13 of the seat 9 against the respective side of the section 7 of the diaphragm spring 4 whereby the latter urges the wire ring 12 of the seat 8 against the inner side of the cover 3. Each of the lugs 15 can be said to constitute an elastically deformable cantilever or beam which pulls the parts 18, 13, 7 and 12 toward the inner side of the cover 3. In the embodiment of FIGS. 1 and 2, the distance 25 between the axis 26 of a rivet 14 and the respective junction 21 is or approximates five times the thickness 24 of the cover 3. The aforediscussed ability of the lugs 15 to act not unlike elastically deformable cantilevers ensures that the section 7 of the diaphragm spring 4 is clamped between the wire rings 12 and 13.

The force with which the lugs 15 urge the wire ring 13 toward the respective side of the section 7 of the diaphragm spring 4 exceeds the force which is required to tilt the diaphragm spring between the seats 8 and 9 in response to the application of a push or pull upon the prongs 4a of the diaphragm spring (depending upon whether the friction clutch is a so-called push-type or a so-called pull-type clutch). Such selection of the force which is applied by the lugs 15 ensures that the lugs can compensate for wear upon the wire rings 12, 13 and upon the adjacent portions of the diaphragm spring 4 and cover 3 during the entire useful life of the friction clutch. In other words, as the wear upon the part 3, 4, 12 and/or 13 in the region 22 progresses, the lugs 15 simply move further axially outwardly and thereby ensure that the section 7 of the diaphragm 4 is always held between the wire rings 12 and 13 without any play. In order to ensure that the entire portion of each lug 15 between the axis 26 of the respective rivet 14 and the corresponding junction 21 participates in the biasing action upon the wire ring 13 and hence in retention of the diaphragm spring 4 between the wire rings 12 and 13 without any play (in other words, that the entire length 25 of each lug 15 is elastically stressed as a result of the formation of the head 16 on the respective rivet 14), the inner side of each lug 15 is spaced apart from the adjacent portion of the wire ring 12. The resulting clearance is shown at 28 in FIG. 2. Such clearance can be obtained by corrugating the respective portion of each lug 15 so that the concave side of the corrugation faces the wire ring 12, by removing some material at the inner side of each lug 15 and/or by impressing an arcuate groove or flute into the inner side of each lug 15 in register with the adjacent portion of the wire ring 12. The establishment of clearances 28 ensures that the lugs 15 do not directly abut against the adjacent portions of the wire ring 12, i.e., that the latter is in contact only with the inner side of the cover 3 in the regions between neighboring slits 19. This, in turn, ensures that the entire effective length (25) of each lug 15 participates in the application of a bias to the wire ring 13 in a direction to urge the latter against the respective side of the section 7 of the diaphragm spring 4. In the embodiment of FIGS. 1 and 2, the clearance 28 is established by providing the inner sides of the lugs 15 with arcuate grooves or flutes adjacent to the respective portions of the wire ring 12.

As indicated in FIG. 1 by phantom lines 15a, the legs of each U-shaped slit 19 need not be exactly parallel to each other but can make an acute angle which tapers inwardly toward the axis of the friction clutch. In other words, the width of each (wedge-like) lug 15 can decrease in a direction from the junction 21 toward the axis of the cover 3. In this manner, the manufacturer of the cover 3 can influence the flexibility of the lugs 15 and hence the force with which the lugs 15 cause the wire ring 13 to bear against the section 7 of the diaphragm spring 4.

Figure 9:
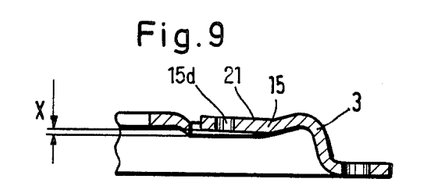
FIG. 9 is a fragmentary sectional view of a clutch cover which constitutes a modification of the cover shown in FIGS. 1 and 2.

It is also possible to modify the cover 3 of FIGS. 1 and 2 in a manner as shown in FIG. 9. Thus, each lug 15 is bent axially outwardly (away from the pressure plate 1 which is not shown in FIG. 9) by flexing it (at 21) through a distance such that the elastic limit of the material of the flexed portion of the lug 15 is exceeded. The distance between the inner side of the major part of the cover 3 in the region of the junction 21 and the inner side of the outwardly flexed lug 15 in the region of its opening 15d for the corresponding portion 14d of the rivet 14 is shown at X and can be in the range of one millimeter, depending on the nature of the material of the cover 3.

The friction clutch of FIGS. 1 and 2 is assembled as follows:

It is assumed that the cover 3 is finished and that the lugs 15 are formed in a manner as described in connection with FIGS. 1 and 2 with or without flexing in a manner as described with reference to FIG. 9. The wire ring 12 of the seat 8 is placed against the inner side of the cover 3 and the section 7 of the diaphragm spring 4 is placed over the wire ring 12. The wire ring 13 of the seat 9 is suspended on the prefabricated heads 18 of the rivets 14 and the portions 14d of such rivets (which at that time are without heads 16) are inserted through the openings 15d of the respective lugs 15. The lugs 15 are then flexed inwardly toward the pressure plate 1 and the portions 14d of the rivets 14 are formed with the outer heads 16 to complete the assembly of the parts 4, 12 and 13 with the cover 3. Once the heads 16 are formed, the lugs 15 tend to move axially outwardly and cause the heads 18 of the rivets 14 to urge the wire ring 13 against the section 7 of the diaphragm spring 4 whereby the section 7 causes the wire ring 12 to bear against the inner side of the cover 3 between the neighboring slits 19. The lugs 15 do not bear directly against the wire ring 12 and/or vice versa due to the provision of the aforediscussed clearances 28 which, in the embodiment of FIGS. 1 and 2, are obtained by forming the inner sides of the lugs 19 with flutes or grooves in the region 22 where the section 7 of the diaphragm spring 4 is flanked by the wire rings 12, 13 of the respective seats 8 and 9.

The length 29 of the shank portion 17 of each rivet 14 between the head 18 and the shoulder 30 between the shank portions 17 and 14d is preferably selected in such a way that the flexing of each lug 15 in a direction toward the pressure plate 1 for the purpose of forming the outer head 16 involves a deformation (during a certain stage of such flexing) beyond the elastic limit of the material of the cover 3. The lugs 15 abut against the respective shoulders 30 when the making of the outer heads 16 is completed.

An important advantage of the friction clutch which is shown in FIGS. 1 and 2 is its simplicity. Thus, this clutch can employ standard components including fasteners in the form of rivets, a standard diaphragm spring with apertures in the form of slots between its prongs and/or other forms of openings, and two standard seats in the form of wire rings 12 and 13. Such seats can be mass-produced in available wire making and/or other types of machines at a low cost.

The force with which the axially stressed lugs 15 urge the heads 18 of the rivets 14 against that side of the seat 13 which faces away from the annular section 7 of the diaphragm spring 4 exceeds the force which must be applied to the tips of the prongs 4 in order to engage or disengage the friction clutch i.e., in order to tilt the section 7 of the diaphragm spring between the wire rings 12 and 13 of the respective seats 8 and 9. By properly selecting the dimensions of the lugs 15 (this includes proper selection of the thickness 24 of the cover 3, of the distances 23 and of the distances 25), the manufacturer of the improved friction clutch can accurately determine the force with which the annular section 7 of the diaphragm spring 4 is held, without play, between the wire rings 12 and 13 as well as the extent to which the lugs 15 must be flexed in order to store requisite amounts of energy. Proper dimensioning can further involve adequate selection of the width of the lugs 15, as considered in the circumferential direction of the diaphragm spring 4, as well as adequate selection of the thickness and/or width of those end portions (at 21) of the lugs 15 where they merge into the major portion of the cover 3. For example, the flexibility of the lugs 15 can be enhanced by reducing their width and/or thickness in the regions where they merge into the main portion of the cover 3.

In order to compensate for eventual manufacturing tolerances as well as for progressing wear upon the cover 3, wire rings 12, 13 and section 7 of the diaphragm spring, the configuration and the dimensions of the lugs 15 can be selected in such a way that the energy which is stored by the stressed lugs suffices to maintain the section 7 in continuous contact with the wire rings 12 and 13 not only when the parts 3, 4, 12 and 13 are new but also after a long period of use and also during actual engagement or disengagement of the friction clutch, i.e., during actual tilting of the section 7 relative to the seats 8 and 9. Such selection of the dimensions and shape of the lugs 15 further ensures full compensation for the absence of absolute identity of the rivets 14 and eventual differences between the lengths of the finally applied rivets (namely, the differences between the distance of the head 16 from the head 18 on one of the rivets and the distance of the heads 16 from the heads 18 on the other rivets).

The feature that the lugs 15 are separated from the adjacent wire ring 12 by clearances 28 contributes significantly to the ability of the lugs to undergo the required stressing which is required to ensure that the section 7 of the diaphragm spring 4 will not wobble between the seats 8 and 9 irrespective of whether the friction clutch is new or after a long period of extensive use.

Figure 3:
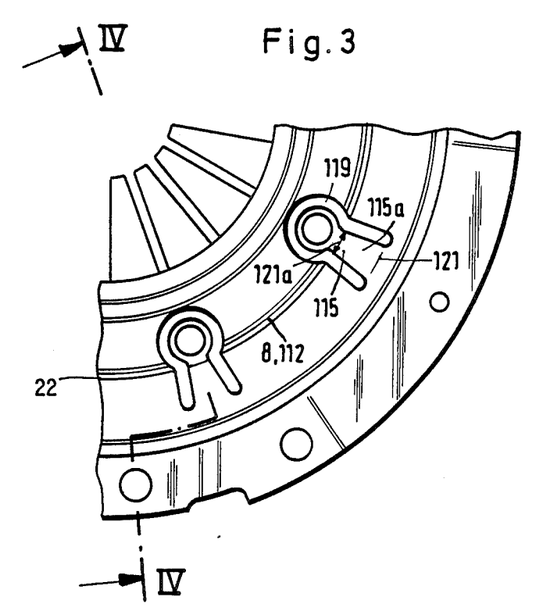
FIG. 3 is a fragmentary plan view of a second friction clutch wherein one of the seats for the diaphragm spring is integral with the cover.
Figure 4:
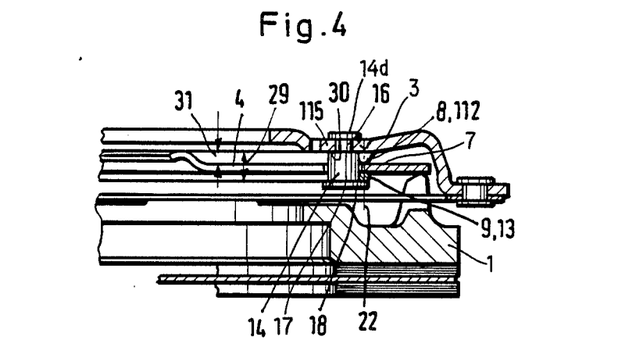
FIG. 4 is a fragmentary sectional view as seen in the direction of arrows from the line IV—IV of FIG. 3.

FIGS. 3 and 4 illustrate a portion of a modified friction clutch wherein the seat 8 at the outer side of the annular section 7 of the diaphragm spring 4 is constituted by a ring-shaped corrugation 112 of the cover 3. The corrugation 112 comprises a plurality of arcuate portions each of which is disposed between two neighboring horseshoe-shaped or keyhole-shaped slits or cuts 119 in the cover 3. The making of substantially horseshoe-shaped or keyhole-shaped slits 119 results in the formation of axially movable portions or lugs 115 each of which has a wedge-like radially outer part 115a and a substantially washer-like radially inner part. The absence of corrugations on the lugs 115 automatically ensures the establishment of a clearance 31 (corresponding substantially to but exceeding the clearance 28 shown in FIG. 2) between the inner side of each lug 115 and the respective side of the section 7 of the diaphragm spring 4 is invariably clamped between the wire ring 13 of the seat 9 and the corrugation 112 of the seat 8, even if the parts 13, 7 and 112 undergo extensive wear during the useful life of the friction clutch.

The taper of the wedge-like parts 115a of the lugs 115 is preferably selected in such a way that the tension in each such part is the same all the way between the junction 121 where the part 115a merges into the major part or portion of the cover 3 and the radially inner end of the part 115a; such inner end is located in the region or zone 22 where the section 7 of the diaphragm spring 4 is located between the wire ring 13 and the corrugation 112. The narrowest portion 121a of the part 115a of the lug 115 is in register with the region 22. The feature that the part 115a of each lug 115 tapers toward the region 22 is desirable and advantageous because this renders it possible to lengthen the arcuate sections of the composite corrugation 112, i.e., to increase the area of contact between the corrugation 112 and the respective side of the section 7 of the diaphragm spring 4.

It has been found that the tensioning of the lugs 115 is particularly satisfactory if the ratio of the width 121a of the narrowest portions of the wedge-like parts 115a of the lugs 115 (as considered in the circumferential direction of the cover 3) to the width of the widest portions of such parts is approximately two-to-three. This not only ensures satisfactory tensioning of the lugs 115 but also enhances their elasticity when the cover 3 is still new so that it is necessary to exert a smaller force in order to ensure adequate flexing of the lugs 115 axially inwardly toward the pressure plate 1 preparatory to the making of the outer heads 16. Highly satisfactory results are further achieved if the length of each wedge-like part 115a (as considered in the radial direction of the cover 3, i.e., in a direction from the junction 121 toward the narrowest portion 121a of the respective part 115a) is approximately two times the width 121a.

The lugs 115 can be flexed axially outwardly to an extent which is within the elastic limits of the material of the cover 3 or in a manner and to the extent as described in connection with FIG. 9.

As a rule, flexing of the lugs 115 in a direction axially and away from the pressure plate 1 can be dispensed with due to the fact that the corrugation 112 of the seat 8 on the cover 3 is interrupted between the legs of each horseshoe-shaped or keyhole-shaped slit 119, i.e., due to the provision of rather pronounced clearances 31 between the inner sides of the parts 115a and the adjacent side of the section 7 of the diaphragm spring 4. All that is necessary is to properly select the axial length of the rivets 14 which are used in the friction clutch of FIGS. 3 and 4 so as to ensure that, once the heads 16 are formed, the lugs 115 are stressed to the extent which suffices to adequately bias the wire ring 13 against the section 7 of the diaphragm spring 4, and to thereby bias the section 7 against the corrugation 112, during the entire useful life of the cover 3 and parts 4, 13. Thus, the making of heads 16 entails some flexing of the lugs 115 toward the pressure plate 1 so that the lugs 115 store sufficient amounts of energy to compensate for wear upon the corrugation 112, section 7 of the diaphragm spring 4, wire ring 13 and heads 16, 18 of the rivets 14 during the entire useful life of the friction clutch or of the just enumerated components of the friction clutch.

In the embodiment of FIGS. 3 and 4, the thickness (i.e., the diameter) of the wire ring 13, plus the thickness of the section 7 of the diaphragm spring 4 and the thickness of the corrugation 112 (as considered in the axial direction of the friction clutch, exceeds the length 29 of the shank portion 17 of each rivet 14 between the head 18 and the shoulder 30 intermediate the portions 17 and 14d.

The utilization of a cover with lugs which constitute wedges or include wedge-like portions is especially desirable and advantageous when the manufacturer desires to select the stressing of the lugs with a very high degree of accuracy. Thus, by properly selecting the taper of the parts 115a the relatively wide end portions which merge into the major portion of the cover 3 and the region 22, the manufacturer can further control the characteristics of the lugs 115 to thus ensure a highly satisfactory selection of the force with which the heads 18 of the rivets 14 urge the seat 9 against the section 7 of the diaphragm spring 4 and the force with which the section 7 bears against the seat 8.

Figure 5:
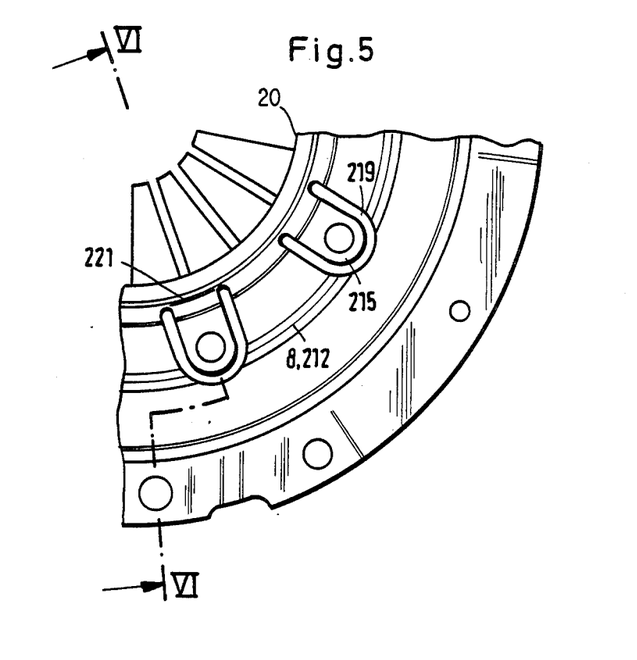
FIG. 5 is a fragmentary plan view of a third friction clutch which employs modified coupling means replacing one of seats for the diaphragm spring.
Figure 6:
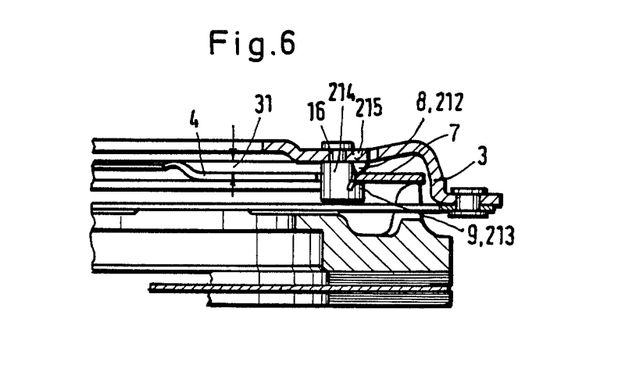
FIG. 6 is a fragmentary sectional view as seen in the direction of arrows from the line VI—VI of FIG. 5.

Referring to FIGS. 5 and 6, there is shown a friction clutch wherein the junctions 221 between the lugs 215 and the major portion of the cover 3 are located close to the inner marginal portion 20 of the cover. Thus, the U-shaped slits 219 are formed in such a way that the free ends of their legs are located radially inwardly and the lugs 215 extend radially outwardly of the respective junctions 221. The seat 8 on the cover 3 comprises a corrugation 212 which is provided on the cover and is interrupted by the U-shaped slits 219. The wire ring 13 is replaced by suitably configurated portions of the rivets 214 which are similar to those disclosed in French Pat. No. 1,524,350. Thus, the rivets 214 are formed with shoulders 213 which replace the wire ring 13 and constitute the corresponding seat 9 for the section 7 of the diaphragm spring 4. The lugs 215 are stressed by the heads 16 of the rivets 214 so that the shoulders 213 urge the section 7 of the diaphragm spring 4 against the corrugation 212 of the seat 8 during each stage of the useful life of the cover 3, diaphragm spring 4 and cover 3.

An advantage of the friction clutch of FIGS. 5 and 6 is that the number of components is reduced by one because the shoulders 213 of the rivets 214 can perform the function of the wire ring 13. Moreover, the corrugation 212 is an integral part of the cover 3 so that there is no need to machine one or two discrete seats for the section 7 of the diaphragm spring 4. This simplifies and speeds up the assembly of the parts including the cover 3, the seats for the diaphragm spring 4 and the diaphragm spring.

Due to the fact that the corrugation 212 is interrupted between the legs of each slit 219, the lugs 215 need not be bent or flexed axially outwardly prior to the making of the heads 16 because the clearances between the inner side of the cover 3 and the section 7 of the diaphragm spring 4 are sufficient to ensure that the lugs 215 cannot contact the section 7 when the making of the outer heads 16 is completed.

Figure 7:
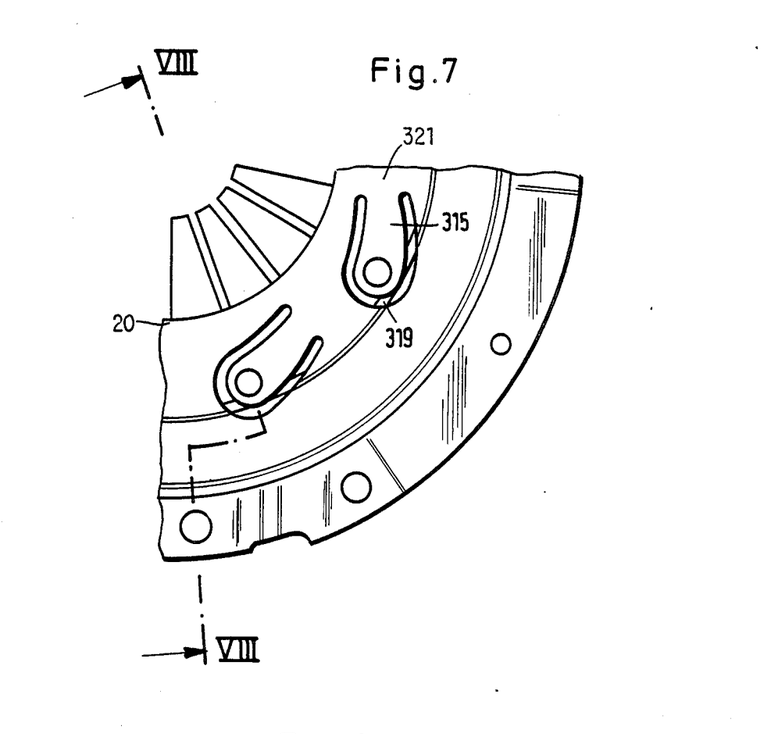
FIG. 7 is a fragmentary plan view of a fourth friction clutch wherein the lugs of the cover extend in the circumferential direction of the diaphragm spring.
Figure 8:
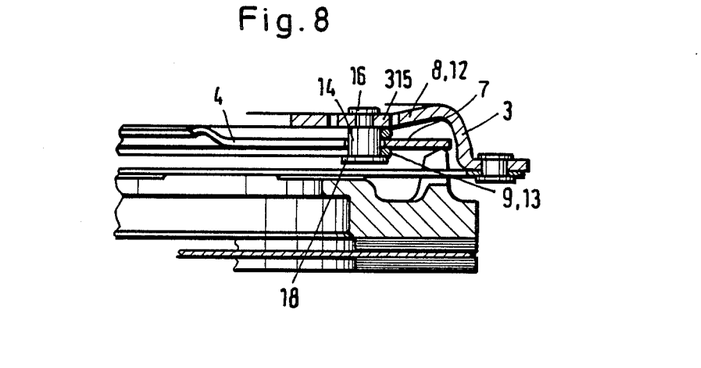
FIG. 8 is a fragmentary sectional view as seen in the direction of arrows from the line VIII—VIII of FIG. 7.

The friction clutch of FIGS. 7 and 8 comprises a cover 3 whose lugs 315 extend substantially circumferentially of the clutch, i.e., circumferentially of the inner marginal portion 20 of the cover 3. The legs of the substantially horseshoe-shaped slits 319 are curved and extend substantially but not exactly tangentially of the corresponding regions of the cover 3. The lugs 315 are somewhat longer than the lugs 15, 115 or 215 and the junctions 321 between the lugs 319 and the major portion of the cover 3 extend substantially radially of the friction clutch. Each of the seats 8, 9 comprises a discrete wire ring 12, 13 and the configurations of the coupling means or rivets 14 are the same as those of the rivets used in the embodiment of FIGS. 1, 2 and 9. The heads 18 of the rivets 14 bear against the adjacent portions of the wire ring 13 with a force which suffices to ensure that the section 7 of the diaphragm spring 4 is clamped between the wire rings 12 and 13 irrespective of the extent of wear upon the parts 14, 12, 13 and 4. The head 16 of each rivet 14 can be said to be rigid or even integral with the lug 15, 115, 215 or 315.

The lugs 15 can have an arcuate shape with a curvature which approximates that of the wire rings 12 and 13.

Figure 10:
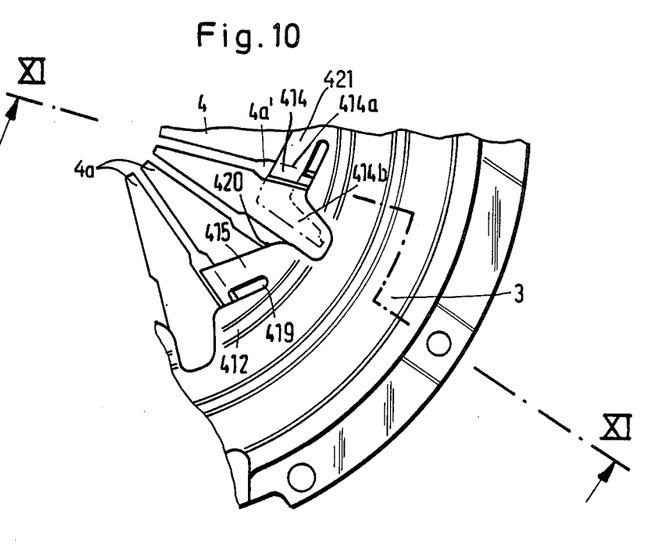
FIG. 10 is a fragmentary plan view of a further friction clutch wherein the coupling means constitute integral parts of the cover.
Figure 11:
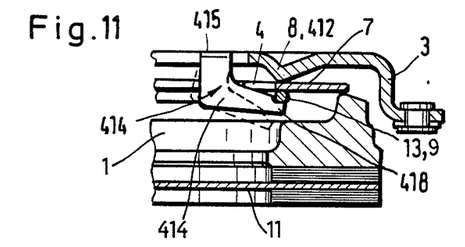
FIG. 11 is a fragmentary sectional view as seen in the direction of arrows from the line XI—XI of FIG. 10.

The friction clutch of FIGS. 10 and 11 comprises a cover 3 whose seat 8 constitutes a composite corrugation 412 at the outer side of the section 7 of the diaphragm spring 4. The inner side of the section 7 is engaged by a wire ring 13 which constitutes the other seat 9 for the diaphragm spring 4. The lugs 414 of the cover 3 not only replace the lugs 15, 115, 215 or 315 but also the coupling means 14 or 214. Each of the lugs 414 is bent axially inwardly so that a portion 414b thereof constitutes a fastener which extends through one of the apertures or slots 4a' machined into or otherwise formed in the radially innermost portion of the diaphragm spring 4 and alternating with the aforementioned prongs 4a. Each of the lugs 414 is folded inwardly along a line 414a which extends substantially radially of the cover 3 so that the folded over second portion or fastener 414b of each such lug extends axially toward the clutch plate 1 and in a plane which is disposed substantially radially of and includes the axis of the friction clutch. The just mentioned planes are disposed at least substantially at right angles to the direction of rotation of the cover 3, diaphragm spring 4 and pressure plate 1 when the crankshaft of the engine drives the flywheel which transmits torque to the cover 3, pressure plate 1 and diaphragm spring 4 (as well as to the clutch disc 11 when the friction clutch is engaged). The lugs 414 are obtained by providing the cover 3 with suitably configured slits or cuts 419 or by actually removing some material of the cover so that each slit 419 has a certain width. Those (first) portions (cantilevers) of the lugs 414 which are not bent into the aforementioned radial planes are denoted by the characters 415 and they are located in the general plane of and merge into the adjacent portions of the cover 3. The portions 415 are immediately adjacent to those end portions (421) of the respective lugs 414 which continue to form integral parts of the cover 3. The lugs 414 are formed in the inner marginal portion 420 of the cover 3. In the embodiment of FIGS. 10 and 11, each slit 419 is actually a more or less straight slit which partially separates the first portion or cantilever 415 from the major part of the cover 3 as can be readily seen in FIG. 11. The slits 419 extend substantially tangentially of the inner marginal portion 420 of the cover 3 and the length of each slit 419 suffices to ensure that each of the first portions or cantilevers 415 can act not unlike an elastically deformable beam in order to ensure adequate biasing of the wire ring 13 of the seat 9 against the respective side of the section 7 of the diaphragm spring 4. The arrangement is preferably such that the material of the lugs 414 does not have to undergo a deformation beyond the elastic limit of the material of the cover 3 when the wire ring 13 is adequately biased against the section 7 of the diaphragm 4.

As shown in FIG. 11 by broken lines, the second portions or fasteners 414b of the lugs 414 are initially bent to assume positions in which their free end portions of tips 418 allow for insertion of the wire ring 13, i.e., the wire ring 13 can be placed against the inner side or surface of the section 7 of the diaphragm spring 4. At such time, the end portions or tips 418 of the bent-over portions 414b are located radially inwardly of the wire ring 13. In the next step, the portions 414b of the lugs 414 are bent radially outwardly, i.e., to the right, as viewed in FIG. 11, so that the tips 418 bear against the inner side of the ring 13 and urge the latter against the section 7 so that the section 7 bears against the corrugation 412 of the cover 3. The energy which is thereby stored by the portions or cantilevers 415 of the lugs 414 suffices to ensure that the lugs can compensate for eventual wear upon the wire ring 13, section 7 of the diaphragm spring 4 and the corrugation 412 of the cover 3 during the entire useful life of the friction clutch.

In assembling the friction clutch of FIGS. 10 and 11, the section 7 of the diaphragm spring 4 is first placed against the corrugation 412 of the cover 3 and the wire ring 13 is slipped over the tips 418 of the portions 414b of the lugs 414 so that it abuts against the inner side of the section 7. In the next step, the entire lugs 414 are preferably bent radially outwardly of the friction clutch so that the tips 418 of the portions 414b bear against the wire ring 13 and the portions 415 of the lugs 414 store energy which suffices to ensure that the section 7 of the diaphragm spring 4 is invariably clamped between the corrugation 412 and the wire ring 13 in spite of eventual minor or pronounced wear upon the ring 13, corrugation 412 and/or section 7 and/or tips 418 of the portions 414b. The final position of one of the portions 414b is shown in FIG. 11 by solid lines.

In order to ensure that the portions 415 of the lugs 414 will store adequate amounts of energy after the portions 414b assume the final positions corresponding to the solid-line position of the portion 414b shown in FIG. 11, i.e., that the section 7 of the diaphragm spring 4 will be adequately biased against the sections of the corrugation 412 between neighboring lugs 414, the portions 415 are stressed axially in the direction toward the pressure plate 1 during bending of each portion 414b from the broken-line to the solid-line position of FIG. 11. This can be achieved, for example, by bending the portions 414b beyond the positions which are necessary to move the respective tips 418 into adequate engagement with the wire ring 13. This ensures that the portions 415 store energy and continuously tend to move toward the pressure plate 1 which, in turn, causes the tips 418 of the portions 414b to urge the wire ring 13 toward the respective side of the section 7 of the diaphragm spring 4.

The making of slits 419 in the inner marginal portion 420 of the cover 3 is particularly desirable and advantageous when the lugs 414 include portions (415) that perform the functions of the lugs 15, 115, 215 or 315 as well as portions (414b) which perform the functions of the aforedescribed fasteners 14 or 214. On the other hand, the embodiments which are shown in FIGS. 1 to 8 exhibit the advantage that the cover 3 is stiffer (as considered in the axial direction of the clutch), especially in the region of its inner marginal portion, because the slits (such as 19, 119, 219 and 319) are not open. The lugs can be formed in a stamping press or in any other suitable machine tool. Also, if the material of the cover 3 is a casting, the lugs can be formed during the making of the cover. The provision of lugs which are spaced apart from the inner marginal portion of the cover 3 is particularly desirable if such lugs are connected with prefabricated fasteners (such as the aforedescribed rivets 14 and 214) in order to apply the required stress to the seat 9 or directly to that side of the diaphragm spring which faces away from the seat 8.

Figure 12:
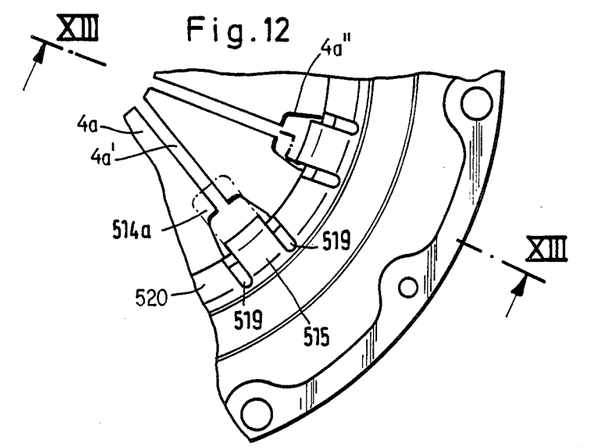
FIG. 12 is a fragmentary plan view of a friction clutch which constitutes a first modification of the clutch shown in FIGS. 10 and 11.
Figure 13:
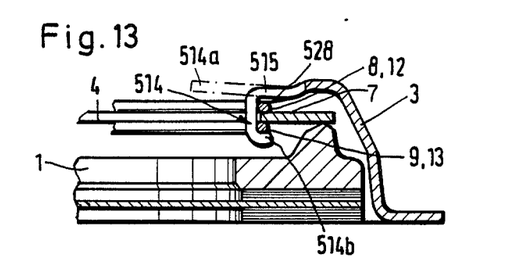
FIG. 13 is a fragmentary sectional view as seen in the direction of arrows from the line XIII—XIII of FIG. 12.

The friction clutch of FIGS. 12 and 13 constitutes a modification of the clutch which is shown in FIGS. 10 and 11. The lugs 514 of the cover 3 comprise cantilever portions 515 which are located in the general planes of the adjacent portions of the cover 3 and portions 514b which are bent into planes extending circumferentially of the cover 3 from the original positions one of which is indicated in FIG. 13 by phantom lines, as at 514a. Each of the bent portions 514b extends axially of the friction clutch and through the adjacent enlarged portion 4a" of the respective slot 4a' in the diaphragm spring 4 between the two neighboring prongs 4a. The tips of the portions 514b are then bent radially outwardly so that they overlie the adjacent portions of the inner wire ring 13 of the seat 9 and urge the ring 13 against the section 7 of the diaphragm spring 4 which, in turn, urges the section 7 against the wire ring 12 of the seat 8 so that the latter is pressed against the inner side of the cover 3 between the cantilever portions 515 of the neighboring lugs 514. The portions 515 of the lugs 514 are formed by providing the radially innermost marginal portion 520 of the cover 3 with pairs of radially extending slits 519. Each of the portions 515 constitutes an elastically deformable beam which is capable of storing a sufficient amount of energy to ensure that the section 7 of the diaphragm 4 remains clamped between the wire rings 12 and 13 during the entire useful life of the assembly including the diaphragm spring 4, the cover 3 and the wire rings 12, 13 as soon as the tips of the portions 514b of the lugs 514 are bent in a manner as shown in FIG. 13.

In order to ensure that the just discussed clamping of the section 7 of the diaphragm spring 4 between the wire rings 12 and 13 remains unchanged during the useful life of the parts 3, 4, 12 and 13, the portions 515 of the lugs 514 are preferably bent outwardly slightly beyond the elastic limit of the material of the cover 3 before the tips of the portions 514b are bent radially outwardly to the positions corresponding to that of the tip of the portion 514b which is shown in FIG. 13. The bending of portions 515 beyond the elastic limit of the material of the cover 3 takes place in the axial direction of the friction clutch and away from the pressure plate 1. The arrangement is preferably such that the portions 515 of the lugs 514 and the adjacent portions of the wire ring 12 define clearances 528 which correspond to the clearance 28 of FIG. 2 and ensure that the portions 515 cannot bear directly against the adjacent portions of the wire ring 12 when the bending of the tips of portions 514b to their final positions is completed.

Figure 14:
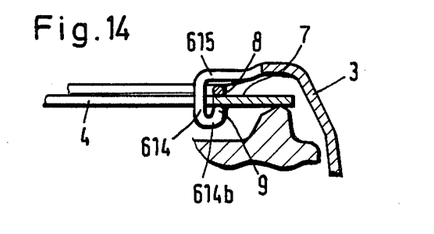
FIG. 14 is a fragmentary sectional view of a friction clutch constituting a second modification of the clutch which is shown in FIGS. 10 and 11.

If desired, the wire ring 12 of FIGS. 12 and 13 can be replaced with a corrugation which is an integral part of the cover 3. Such corrugation preferably consists of a set of arcuate sections each of which extends between two neighboring lugs 514. The same holds true for the friction clutch of FIG. 14 wherein the wire ring 13 is omitted and the tips 614b of the lugs 614 constitute the seat 9 at the inner side of the section 7 of the diaphragm spring 4. In all other respects, the structure of FIG. 14 is or can be identical with that of FIGS. 12 and 13. The portions 615 of the lugs 614 are cantilevers which store energy and urge the section 7 against the seat 8 of the cover 3 through the medium of the tips 615b.

The friction clutch of the present invention exhibits the important advantage that the cover or housing 3 can perform a host of important functions including confining the diaphragm spring 4, the pressure plate 1 and the clutch disc 11 as well as eliminating any play between the diaphragm spring section 7 and the two seats irrespective of the wear upon the cover, diaphragm spring and one or both seats. All that is necessary is to properly select the dimensions of the lugs, the dimensions of the lugs in the regions of their junctions with the major portion of the cover and/or the extent to which the lugs are stressed and deformed axially when the clamping of the section 7 of the diaphragm spring 4 between the two seats is completed. This not only ensures that the section 7 of the diaphragm spring 4 is held between the two seats without any play when the making of the friction clutch is completed but also that the absence of such play is guaranteed during the entire useful life of the cover, diaphragm spring and seats. The diaphragm spring can be readily tilted between its seats and the adjustment for eventual wear upon the section 7 of the diaphragm spring, upon the seat at the inner side of the section 7 and/or the seat at the outer side of the section 7 is automatic due to adequate stressing of the lugs during clamping of the diaphragm spring section 7 between the two seats. In addition, the just described mode of assembling the parts of the improved friction clutch ensures that the lugs compensate for eventual machining tolerances so that the section 7 of the diaphragm spring 4 is held between the two seats 8 and 9 without any play even if the actual dimensions of the seat 8, seat 9, cover 3 and/or diaphragm spring 4 deviate from optimum dimensions not as a result of wear upon such parts but already at the time when these parts are assembled with each other, either by resorting to rivets 14 or 214 or by using lugs with tips (such as 614b) which urge the seat 9 against the respective side of the section 7 of the diaphragm spring 4.

The material of the housing or cover need not be different from the materials of heretofore known covers. It has been found that the materials of conventional covers exhibit the requisite degree of elasticity which is desirable to enable the lugs to store energy that is needed to maintain the section 7 of the diaphragm 4 in adequate contact with the neighboring seat or seats for long periods of time. Of course, this does not exclude the making of the covers from a material which exhibits an even more satisfactory elasticity.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a housing including a main portion and flexible elastic lugs integral with said main portion; an annular seat integral with and disposed at one side of said housing, said seat including first sections alternating with said lugs and second sections provided on said lugs; a diaphragm spring including an annular section having a first side facing said seat and a second side, the thickness of said second sections as considered in the axial direction of said diaphragm spring being less than the thickness of said first sections; and means for coupling said spring to said housing, including fasteners rigid with said lugs, extending through said spring and having portions disposed at the second side of said section of said spring, said portions of said fasteners cooperating with said spring and with said seat to maintain the respective lugs in stressed condition so that such lugs cause said portions of said fasteners to bias said section of said spring against said seat.

2. A friction clutch, particularly for use in motor vehicles, comprising a cover having integral cut out flexible elastic lugs including cantilever-like beams; a seat at one side of said cover; a diaphragm spring having a first side facing toward and a second side facing away form said seat, said lugs being stressed in the axial direction of said spring and said spring being tiltable relative to said seat; a pressure plate adjacent the second side of said spring and being arranged to be biased by said spring; and discrete fastener means each rigid with one of said lugs, each of said fastener means having a first portion extending substantially axially through said spring and a second portion disposed at said second side and at least indirectly bearing axially against said spring.

3. The friction clutch of claim 2, wherein each of said lugs has a free end movable relative to said cover and said fastener means are secured, particularly riveted, to the free ends of the respective lugs.

4. The friction clutch of claim 2, wherein the second portion of each of said fastener means bears directly against said spring under the bias of the respective lug.

5. The friction clutch of claim 2, wherein the second portion of each of said fastener means includes a head and further comprising an annualr second seat interposed between said heads and the second side of said spring, said lugs being arranged to bias said heads against said second seat.

6. The friction clutch of claim 2, wherein each of said lugs extends substantially radially of said spring and overlies said seat.

7. The friction clutch of claim 2, wherein each of said lugs extends substantially radially of said spring.

8. The friction clutch of claim 7, wherein each of said lugs has a first end integral with said cover and a second end, said second ends being disposed inwardly of the respective first ends in the radial direction of said spring.

9. The friction clutch of claim 7, wherein each of said lugs has a first end integral with said cover and a second end, said second ends being disposed outwardly of the respective first ends in the radial direction of said spring.

10. The friction clutch of claim 2, wherein each of said lugs extends substantially circumferentially of said spring.

11. The friction clutch of claim 2, wherein each of said lugs has a substantially arcuate shape.

12. The friction clutch of claim 2, wherein said lugs resemble wedges.

13. The friction clutch of claim 2, wherein each of said lugs has a first end integral with said cover and a narrower second end remote from the respective first end.

14. The friction clutch of claim 2, wherein said cover has a substantially ring-shaped inner marginal portion and said lugs are provided at said marginal portion.

15. The friction clutch of claim 2, wherein said cover has a substantially ring-shaped marginal portion and said lugs are disposed radially outwardly of said marginal portion, said cover having cuts partially surrounding said lugs.

16. The friction clutch of claim 2, wherein said cover has substantially U-shaped or V-shaped cuts partially surrounding said lugs.

17. The friction clutch of claim 2, wherein said seat is integral with said cover and includes a plurality of sections alternating with said lugs.

18. The friction clutch of claim 17, wherein said seat includes additional sections alternating with said plurality of sections and provided in said lugs, each of said plurality of sections having a first thickness and each of said additional sections having a lesser second thickness.

19. The friction clutch of claim 2, wherein said cover has a predetermined thickness and each of said lugs includes a first end merging into said cover and a second end spaced apart from the first end a distance 3.5–10 times, particularly 4–6 times, the thickness of said cover.

20. The friction clutch of claim 2, wherein said cover has a predetermined thickness and each of said lugs has an end merging into said cover, said spring overlying said seat in an annular zone which is spaced apart from the ends of said lugs in the radial direction of said spring a distance of approximately 2–6 times, particularly 2.5–4 times, said predetermined thickness.

21. The friction clutch of claim 2, wherein each of said lugs has an end merging into said cover and the thickness of said ends is less than the thickness of the remaining portions of said lugs.

22. A friction clutch, particularly for use in motor vehicles, comprising a clutch cover defining an axis of rotation; a seat at one side of said cover; a diaphragm spring tiltable on said seat; and a plurality of fastener means for securing said spring to said cover, each of said fastener means including a lug which is cut out and bent out of said cover to define a cantilever-like beam portion contiguous with said cover, a second portion extending substantially axially of and through the spring, and a third portion which at least indirectly bears against said spring, said cantilver-like beam portion being elastically axially stressed so as to bias said third portion which at least indirectly bears against said spring axially toward said seat.

23. The friction clutch of claim 22, wherein said spring has a side facing away from said seat and the third portion of each of said lugs bears directly against said side of said spring under the bias of the beam portion of the respective lug.

24. The friction clutch of claim 22, wherein said spring has a side facing away from said seat and the beam portion of each of said lugs is bent with reference to the axially extending second portion of the respective lug and further comprising an annular second seat interposed between said third portions and said side of said spring, said third portions being arranged to bear against said second seat under the bias of the beam portions of the respective lugs.

25. The friction clutch of claim 22, wherein each of said lugs extends substantially radially of said spring and overlies said seat.

26. The friction clutch of claim 22, wherein each of said lugs extends substantially radially of said spring.

27. The friction clutch of claim 26, wherein each of siad lugs has a first end intergral with said cover and a second end, said second ends being disposed inwardly of the respective first ends in the radial direction of said spring.

28. The friction clutch of claim 26, wherein each of said lugs has a first end integral with said cover and a second end, said second ends being disposed outwardly of the respective first ends in the radial direction of said spring.

29. The friction clutch of claim 22, wherein each of said lugs extends substantially circumferentially of said spring.

30. The friction clutch or claim 22, wherein each of said lugs has a substantially arcuate shape.

31. The friction clutch of claim 22, wherein said lugs resemble wedges.

32. The friction clutch of claim 31, wherein each of said lugs has a first end integral with said cover and a narrower second end remote from the respective first end.

33. The friction clutch of claim 22, wherein said cover has a substantially ring-shaped inner marginal portion and said lugs are provided at said marginal portion.

34. The friction clutch of claim 22, wherein said cover has a substantially ring-shaped marginal portion and said lugs are disposed radially outwardly of said marginal portion, said cover having cuts partially surrounding said lugs.

35. The friction clutch of claim 22, wherein said cover has substantially U-shaped or V-shaped cuts partially surrounding said lugs.

36. The friction clutch of claim 22, wherein said seat is integral with said cover and includes a plurality of sections alternating with said lugs.

37. The friction clutch of claim 36, wherein said seat includes additional sections alternating with said plurality of sections and provided on said lugs, each of said plurality of sections having a first thickness and each of said additional sections having a lesser second thickness.

38. The friction clutch of claim 22, wherein said cover has a predetermined thickness and each of said lugs includes first end merging into asid cover and a seocnd end spaced apart from the first end a distance 3.5–10 times, particularly 4–6 times, the thickness of said cover.

39. The friction clutch of claim 22, wherein said cover has a predetermined thickness and each of said lugs has an end merging into said cover, said spring overlying said seat in an annular zone which is spaced apart from the ends of said lugs in the radial direction of said spring a distance of approximately 2–6 times, particularly 2.5–4 times, said predetermined thickness.

40. The friction clutch of claim 22, where each of said lugs has an end merging into said cover and the thickness of said ends is less than the thickness of the remaining portions of said lugs.

41. A friction clutch, particularly for use in motor vehicles, comprising a housing including a main portion and flexible elastic lugs integral with said main portion, each of said lugs having an effective length and being capable of undergoing elastic deformation along said length thereof, at least a portion of each of said lugs being cut out of said main portion; an annular seat at one side of said housing; a diaphragm spring including an annular section having a first side facing said seat and said lugs and a second side; and means for coupling said spring to said housing, including discrete fasteners rigid with said portions of said lugs, extending through said spring and having portions disposed at the second side of said section, said portions of said fasteners cooperating with said spring and with said seat to maintain the respective lugs in elastically stressed condition substantially along the full effective length thereof so that such lugs cause said portions of said fasteners to bias said section against said seat.

* * * * *